Patented Jan. 27, 1931

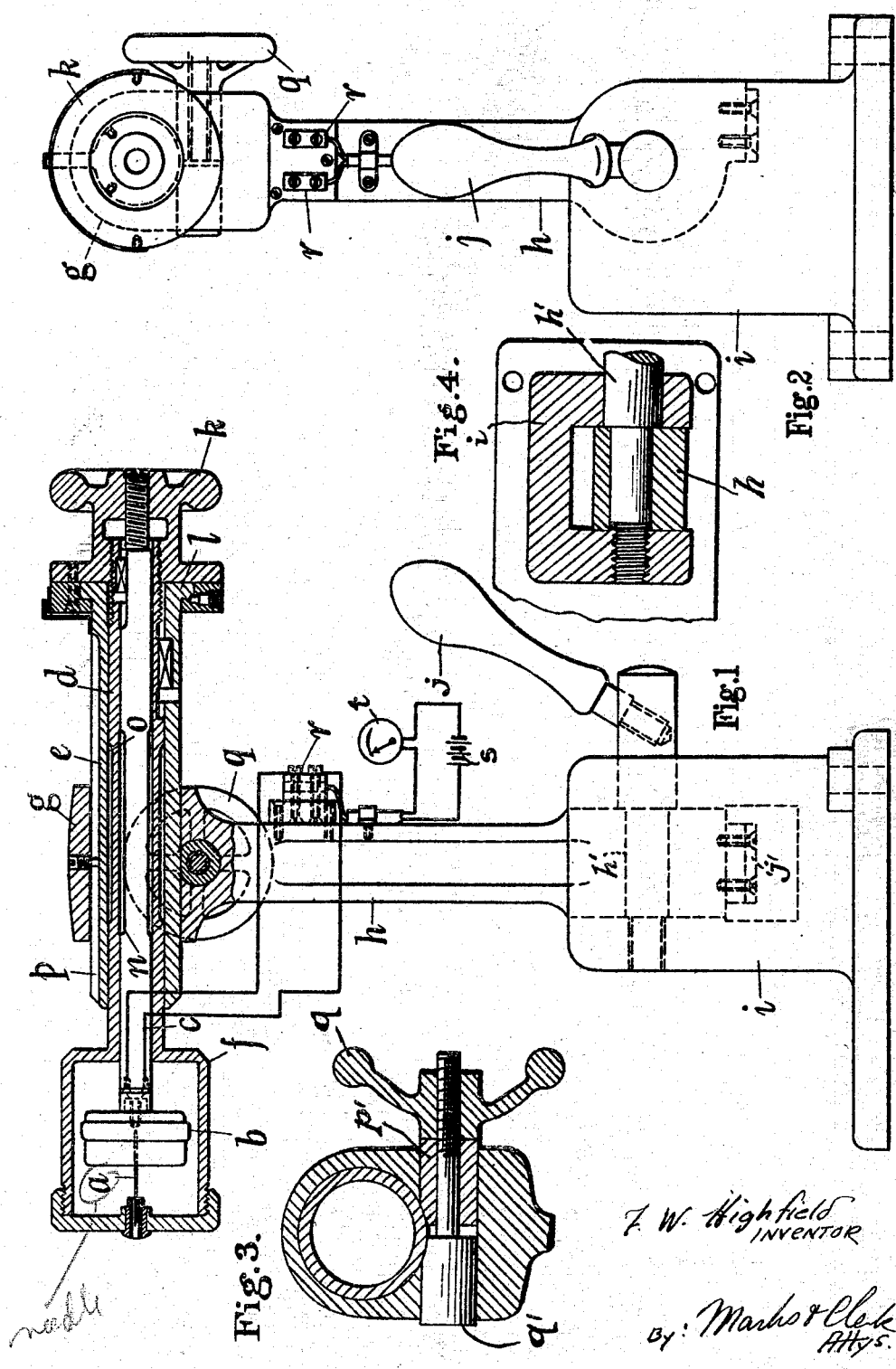

1,790,046

UNITED STATES PATENT OFFICE

FRANK WOOTTON HIGHFIELD, OF COVENTRY, ENGLAND

MEANS FOR MEASURING SOUNDS PRODUCED BY MACHINERY

Application filed February 29, 1928, Serial No. 258,122, and in Great Britain March 23, 1927.

The object of the present invention is to provide simple and satisfactory means for measuring sounds produced by machinery. The necessity for, or desirability of, such measurements arise in a variety of circumstances. For example, in the testing of motor vehicle gear boxes or back axles, it is important to be able to assign a quantitative value to the sounds emitted. By the present invention the required information can be obtained in a ready and reliable manner.

The invention comprises means as hereinafter described whereby an electromagnetic, microphonic or like device can conveniently be brought into contact with the mechanism to be tested without risk of injury to the device.

In the accompanying sheet of explanatory drawings:—

Figures 1 and 2 are part sectional side elevation and end elevation of apparatus constructed in accordance with this invention.

Fig. 3 is an enlarged section showing the means for clamping the sleeve $e$.

Fig. 4 is an enlarged section through the base $i$ showing the means for clamping the standard or arm $h$.

In carrying the invention into effect, I arrange a movable coil or reed in the field of a permanent or electromagnet, and to this coil or reed is attached a light needle or style which can be placed in contact with any convenient part of the mechanism to be tested. Alternatively the style may be arranged in conjunction with a microphone. Any suitable electrical means may be employed for giving a visible indication of the movement of the style.

A conventional form of electromagnetic, microphonic or like device as above described is a relatively delicate piece of apparatus, and unless suitable safeguards are adopted it can easily be injured. When in service the device is liable to be subjected to rough usage, particularly when the margin of time allowed for each test is comparatively small. To facilitate the bringing of the device into contact with the work, and to enable the operator to manipulate the device quickly without serious risk of injury, I have devised the apparatus shown in Figures 1 and 2. The style is represented by $a$. This is connected to any suitable vibratory reed, disc, or moving coil arranged within a case $b$ containing an electromagnet. This group of parts forms the detector and is connected to any suitable external electric circuit containing the indicating instrument.

In Figure 1 the indicating means are shown diagrammatically by a battery $s$ and current indicating instrument $t$, but it will be understood that the parts $s$, $t$, are to be regarded only as symbolical of any electrical means suitable for the purpose.

The detector with its needle or style is carried on one end of a spindle $c$ which is surrounded by a pair of sleeves $d$, $e$. The inner sleeve $d$ terminates at one end in a box $f$ surrounding the detector, a hole being provided in the box into which the needle $a$ can be caused to protrude. The outer sleeve $e$ is slidable in a bearing $g$ which may be mounted on an arm $h$ pivotally mounted on a pin $h'$ having threaded connection with the base $i$ adapted to be secured to any convenient part of the testing machine. The arm $h$ can be fixed by a locking lever $j$. The pivoting of the arm $h$ enables it to be adjusted to any required position. A plate $j'$ is screwed to the lower end of the arm $h$ and serves as a stop for limiting swinging movement of the arm in one direction. The arm may also carry terminals $r$ to which the detector and external circuit leads are connected. A hand wheel $k$ is rotatably connected with the outer end of the sleeve $e$ at the end remote from the detector. The latter, whilst rotatable relatively to the outer sleeve, is incapable of moving relatively to the sleeve in an axial direction, the hand wheel being engaged with a shoulder $l$ on the end of the outer sleeve. The adjacent ends of the inner sleeve $d$ and the spindle $c$ are screw-threaded in opposite directions, and are adapted to engage corresponding internally threaded portions in the hand wheel. Whilst the inner sleeve and spindle are capable of sliding relatively to each other, and to the outer sleeve, they are held against rotational movement by suitable keys $n$, $o$. The outer sleeve is also prevented from rotating within its bearing by means of a suitable key $p$. Furthermore, the outer sleeve can be secured rigidly to its bearing by means of a screw operated or other clamping device actuated by a hand wheel $q$. One way of accomplishing this is the provision of a headed screw $q'$ mounted in the bearing $g$ and having associated therewith a collar $p'$ against which bears the hand wheel $q$ operable to clamp the sleeve $e$ between the head of the screw and collar.

When out of action the style or needle lies within the outer box by which it is properly protected. To bring the device into action the operator slides the whole mechanism forward relatively to the bearing, and so brings the forward end of the box into contact with the mechanism to be tested. The outer sleeve is then clamped to its bearing by the part $q$. On rotating the hand wheel $k$ above-mentioned in the appropriate direction the box $f$ is withdrawn from contact with the mechanism to be tested, and the style or needle is gradually advanced into contact with the said mechanism. On the completion of the test the style is returned into the box, and the whole withdrawn after release of the clamping device acting on the outer sleeve.

It will be obvious that vibrations due to sounds generated within the machinery will be transmitted to the outer case against which the style is caused to bear. These vibrations are transmitted to the microphone or similar device $b$ which converts the sounds into an indication on an ammeter or like instrument $t$.

By means of apparatus as above described, valuable quantitative information can be obtained concerning the noises emitted from the machine under test and adequate protection is afforded to the delicate style $a$ and the parts connected to it.

The invention is not limited to any particular application, nor is it limited to any particular mechanical or electrical details, provided always that the required electro-magnetic or like effect is obtained from direct contact with the machine under test.

Having thus described my invention, what I claim as new and desire to secure by Letters Patent is:—

1. In means for measuring the sounds produced by machinery, the combination comprising a style adapted to be placed in contact with the machine to be tested, electro-magnetic means actuated by and adapted to give an indication of the movement of the style, a movable holder for the style and said electro-magnetic means, a protective casing surrounding the electro-magnetic means and adapted to permit the style to project through the same, means for moving the holder to or from the machine to be tested, and means for imparting relative movement to the protective casing and style, substantially as described.

2. In means for measuring the sounds produced by machinery, the combination comprising a spindle, inner and outer sleeves surrounding the spindle, a support in which the sleeves and spindle are slidably carried, electro-magnetic means and a style carried at one end of the spindle, a protective casing in conjunction with the inner sleeve and arranged to enclose the electro-magnetic means, the said protective casing being adapted to permit the projection therethrough of the style, and means for producing relative movements of the inner and outer sleeves and of the spindle and inner sleeve, substantially as described.

In testimony whereof I have signed my name to this specification.

FRANK WOOTTON HIGHFIELD.